May 17, 1938.   L. MIROW   2,117,900

REGENERATIVE BRAKING SYSTEM

Filed July 17, 1937

WITNESSES:

INVENTOR
Lothar Mirow.
ATTORNEY

Patented May 17, 1938

2,117,900

UNITED STATES PATENT OFFICE 2,117,900

REGENERATIVE BRAKING SYSTEM

Lothar Mirow, Berlin-Siemensstadt, Germany, assignor to Westinghouse Electric & Manufacturing Company, East Pittsburgh, Pa., a corporation of Pennsylvania Application July 17, 1937, Serial No. 154,261
In Germany July 23, 1936

7 Claims. (Cl. 172—179)

My invention relates, generally, to regenerative braking systems and, more particularly, to systems for the regenerative braking of single-phase motors of the commutator type.

In one of the previously known schemes for the regenerative braking of single-phase commutator motors, the armature and the field circuits of the machines are connected in parallel, the proper phase relationship being obtained by means of a capacitor connected in the field circuit. In order to secure a power factor having a favorable value over the entire range of braking that must be covered in operation, a later scheme provides for coupling the armature circuit and the field circuit through an auxiliary transformer having a resistor connected in parallel with the transformer winding that is inserted in the field circuit.

The present invention constitutes a further development of the foregoing scheme, and one of its objects is to make it possible to so change the connections between the transformer provided for coupling the armature and the field circuits and these circuits so that this transformer can be connected either to have a compounding or an anti-compounding effect on the motor.

Another object of the present invention is to make the connection scheme applicable in those cases where it is desired to produce an anti-compounding effect during the normal process of regenerative braking and a straight compounding effect when the braking action is obtained by means of a reversed line current (plugging).

Other objects of the invention either will be explained fully hereinafter or will be apparent to those skilled in the art.

Figure 1:
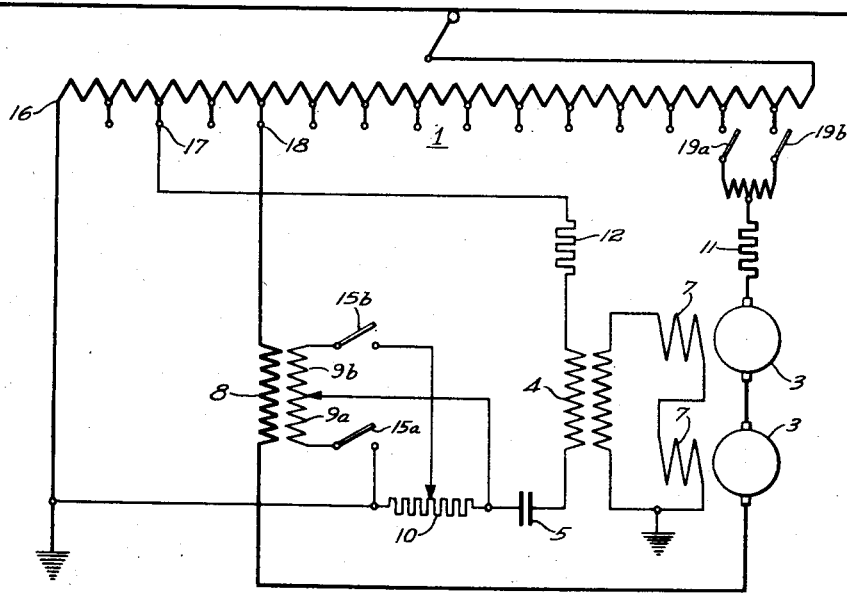
Figure 2:
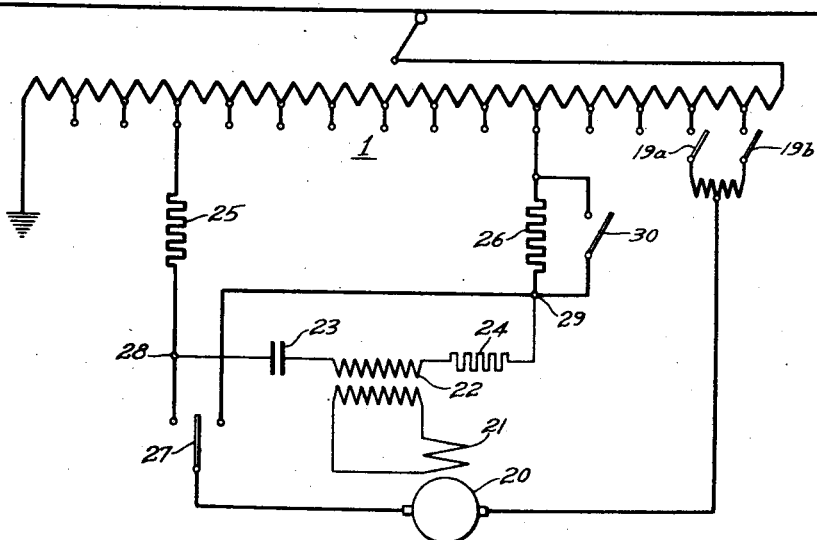

For a fuller understanding of the nature and objects of the invention, references may be had to the following detailed description, taken in conjunction with the accompanying drawing, in which:

Figure 1 is a diagrammatic view of a regenerative braking system embodying the present invention; and Fig. 2 is a diagrammatic view of a modification of the invention.

Referring to Fig. 1 of the drawing, a pair of series-connected motors 3, of the commutator type, are connected to the taps of a vehicle transformer 1 through a stabilizing resistor 11. The resistor 11 is provided in the motor circuit to damp out direct current and high frequency circulating currents which are produced in the armature circuit of the motors during regenerative braking. It may also be utilized to dissipate energy during dynamic braking in case it is desired, or necessary, to retard the vehicle without trolley connections.

Power is supplied to the field windings 7 of the motors by an energizing transformer 4, especially provided for this purpose. The primary circuit of this transformer contains a capacitor 5, which is provided to improve the power factor of this field circuit, a resistor 12, which functions in a manner similar to the resistor 11 to damp out circulating currents, and another resistor 10, the purpose of which will be more fully described hereinafter.

By means of the switches 15a and 15b the resistor 10 can be connected at will, in line with the invention, in parallel-circuit relation with the two winding-sections 9a and 9b of the secondary of a coupling transformer, the primary winding 8 of which is inserted in the armature circuit of the machines 3, the arrangement being such that the switch 15b can be connected to a tap of the resistor 10.

The primary winding of the transformer 4, which energizes the fielding windings 7, is connected to the taps 16 and 17 of the transformer 1, while one terminal of the armature circuit is solidly connected to a tap 18, the other terminal of this circuit being connected through a voltage divider to any pair of adjacent taps 19a—19b.

With the connections shown on the diagram, the system operates as follows: Depending on the positions of the switches 15a and 15b, the resistor 10 is connected in parallel either with the first or with the second winding-section of the secondary of the coupling transformer. In other words, depending on the positions of those switches, the voltage drop occurring in the resistor 10 that is connected in the field circuit, will be changed and eventually reversed in such a manner that either a straight compounding or an anti-compounding effect will be produced. Thus the resistor 10 may be utilized to control the phase angle and the value of the compounding current.

Application of the present connection scheme is especially advantageous when a braking action must be obtained by means of a reversed line current (plugging) because in this case it becomes possible either to reduce or to suppress completely the high voltage drop occurring in the vehicle trransformer on the lower voltage taps.

The system can be adjusted in several ways in order to adapt it as completely as possible to the operating conditions that will be met in practice. For instance, the number of turns of the winding-sections 9a and 9b can be changed by shifting the position of the center tap of the transformer winding. It is also possible to change the location of the tap of the resistor 10 to which is connected the switch 15b.

The fundamental idea disclosed in this invention may also be applied by coupling the armature and field circuits directly by means of a resistor instead of using a compounding transformer. Such a scheme of connections is shown in Fig. 2, in which 20 represents the armature of a motor and 21 the field winding of the latter, power being supplied to this field winding by an energizing transformer 22. In the primary circuit of this transformer are connected a capacitor 23 and resistors 24, 25 and 26. The capacitor 23 and the resistor 24 function to control the phase angle and value of the compounding current in a manner similar to the capacitor 5 and resistor 10 shown in Fig. 1. The resistors 25 and 26 function similarly to the resistors 11 and 12 to prevent circulating currents.

By means of a throw-over switch 27, the armature of the machine may be connected either to the point 28 or to the point 29 of the primary energizing or field circuit. According to the position of this throw-over switch, the voltage drop occurring in the resistors will have either an anti-compounding or a straight compounding effect, the arrangement being such that in one case the armature current and the field current will support each other, while in the other case they will be subtracted from one another. One of the resistors 26 can be short-circuited by means of a switch 30 when a straight compounding effect is being obtained.

I do not desire to be restricted to the particular form or arrangement of parts herein shown and described, since it is evident that they may be changed and modified without departing from the spirit and scope of my invention as defined in the appended claims.

I claim as my invention:

1. In a regenerative braking system, in combination, a motor having an armature winding and a field winding, a power transformer, tap-changing means for connecting the armature circuit of said motor to said power transformer, an additional transformer for energizing the field winding of said motor, resistance and capacitance disposed in the primary circuit of said additional transformer, means for coupling the armature circuit and the field circuit of said motor, and means for changing the coupling connections to produce either a compounding or an anti-compounding effect between the armature current and the field current.

2. In a regenerative braking system, in combination, a motor having an armature winding and a field winding, a power transformer, tap-changing means for connecting the armature circuit of said motor to said power transformer, an additional transformer for energizing the field winding of said motor, resistance and capacitance disposed in the primary circuit of said additional transformer, resistance means for coupling the armature circuit and the field circuit of said motor, and means for changing the coupling connections to produce either a compounding or an anti-compounding effect between the armature current and the field current.

3. In a regenerative braking system, in combination, a motor having an armature winding and a field winding, a power transformer, tap-changing means for connecting the armature circuit of said motor to said power transformer, an additional transformer for energizing the field winding of said motor, resistance and capacitance disposed in the primary circuit of said additional transformer, resistance means for coupling the armature circuit and the field circuit of said motor, and switching means for changing the armature connections in the coupling circuit to produce either a compounding or an anti-compounding effect between the armature current and the field current.

4. In a regenerative braking system, in combination, a motor having an armature winding and a field winding, a power transformer, tap-changing means for connecting the armature circuit of said motor to said power transformer, an additional transformer for energizing the field winding of said motor, resistance and capacitance disposed in the primary circuit of said additional transformer, a transformer for coupling the armature circuit and the field circuit of said motor, and means for changing the transformer connections in the coupling circuit to produce either a compounding or an anti-compounding effect between the armature current and the field current.

5. In a regenerative braking system, in combination, a motor having an armature winding and a field winding, a power transformer, tap-changing means for connecting the armature circuit of said motor to said power transformer, an additional transformer for energizing the field winding of said motor, resistance and capacitance disposed in the primary circuit of said additional transformer, a transformer for coupling the armature circuit and the field circuit of said motor, a resistor disposed in parallel-circuit relation with one winding of said coupling transformer, and means for changing the transformer connections in the coupling circuit to produce either a compounding or an anti-compounding effect between the armature current and the field current.

6. In a regenerative braking system, in combination, a motor having an armature winding and a field winding, a power transformer, tap-changing means for connecting the armature circuit of said motor to said power transformer, an additional transformer for energizing the field winding of said motor, resistance and capacitance disposed in the primary circuit of said additional transformer, a transformer for coupling the armature circuit and the field circuit of said motor, a resistor disposed in parallel-circuit relation with one winding of said coupling transformer, means for changing the transformer connections in the coupling circuit to produce either a compounding or an anti-compounding effect between the armature current and the field current, and means for changing the number of transformer turns connected in parallel with said resistor to vary the intensity of the compounding effect.

7. In a regenerative braking system, in combination, a motor having an armature winding and a field winding, a power transformer, tap-changing means for connecting the armature circuit of said motor to said power transformer, an additional transformer for energizing the field winding of said motor, resistance and capacitance disposed in the primary circuit of said additional transformer, a transformer for coupling the armature circuit and the field circuit of said motor, a resistor disposed in parallel-circuit relation with one winding of said coupling transformer, means for changing the transformer connections in the coupling circuit to produce either a compounding or an anti-compounding effect between the armature current and the field current, and means for varying the amount of said resistor that is connected in parallel with said transformer winding to vary the intensity of the compounding effect.

LOTHAR MIROW.